(12) United States Patent
Katsura et al.

(10) Patent No.: US 6,287,017 B1
(45) Date of Patent: Sep. 11, 2001

(54) OPTICAL CONNECTOR FERRULE, METHOD OF MANUFACTURING THE SAME, AND OPTICAL CONNECTOR USING THE SAME

(75) Inventors: Hiroshi Katsura; Wataru Sakurai; Toshiaki Kakii; Masahiro Shibata, all of Kanagawa (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 09/551,915

(22) Filed: Apr. 19, 2000

Related U.S. Application Data

(63) Continuation-in-part of application No. PCT/JP99/02068, filed on Apr. 19, 1999, and a continuation of application No. 08/998,942, filed on Dec. 29, 1997, now Pat. No. 6,074,577.

(30) Foreign Application Priority Data

| Dec. 19, 1996 | (JP) | ................... 8-349263 |
| Dec. 8, 1997 | (JP) | ................... 9-336220 |
| Dec. 8, 1997 | (JP) | ................... 9-336220 |
| Apr. 20, 1998 | (JP) | ................... 10-109473 |

(51) Int. Cl.$^7$ .................................... G02B 6/38
(52) U.S. Cl. ................. 385/59; 249/64; 425/117
(58) Field of Search ............. 385/55, 56, 59, 385/60, 62, 63; 264/1.1, 1.25, 1.24; 249/63, 64, 142, 177; 425/116, 117, 186, 192 R

(56) References Cited

U.S. PATENT DOCUMENTS

| 5,778,126 | * | 7/1998 | Saitoh ...................... 385/84 |
| 5,780,079 | * | 7/1998 | Lee .......................... 425/577 |
| 5,786,002 | * | 7/1998 | Dean et al. ............... 425/183 |
| 5,815,621 | * | 9/1998 | Sakai et al. .............. 385/80 |

FOREIGN PATENT DOCUMENTS

| 63-55507 | 3/1988 | (JP) . |
| 64-35509 | 2/1989 | (JP) . |
| 2-146510 | 6/1990 | (JP) . |
| 7-159652 | 6/1995 | (JP) . |
| 8-179161 | 7/1996 | (JP) . |
| 9-68627 | 3/1997 | (JP) . |

* cited by examiner

*Primary Examiner*—John D. Lee
*Assistant Examiner*—Sarah N Song
(74) *Attorney, Agent, or Firm*—McDermott, Will & Emery

(57) ABSTRACT

In an optical connector for positioning and fixing the distal end of a fiber optic ribbon cable with a connector ferrule, a guide-pin hole is formed in a mating end connected with another optical connector. A pair of positioning guide pins are inserted into the respective guide-pin holes. The guide-pin hole has an enlarged region whose diameter gradually increases toward the opening end portion of the mating end.

12 Claims, 14 Drawing Sheets

OPTICAL CONNECTOR FERRULE, METHOD OF MANUFACTURING THE SAME, AND OPTICAL CONNECTOR USING THE SAME

RELATED APPLICATION

This is a Continuation-in-part application of the PCT application Ser. No. PCT/JP99/02068 filed on Apr. 19, 1999, which in turn claims the benefit of Japanese Patent Application No. 336220/1997, filed Dec. 8, 1997, U.S. patent application Ser. No. 08/998,942, filed Dec. 29, 1997, now U.S. Pat. No. 6,074,577 and Japanese Patent Application No. 109473/1998, filed Apr. 20, 1998, the disclosures of which Applications are incorporated by reference herein. The benefit of the filing and priority dates of the International, Japanese, and U.S. Applications is respectfully requested. The present application is a continuation of U.S. application Ser. No. 08/998,942 (U.S. Pat. No. 6,074,579) and a continuation-in-part of PCT applicaiton PCT/JP99/02068, filed Apr. 19, 1999.

BACKGROUND OF THE INVENTION

1. Field of the Invention

The present invention relates to an optical connector ferrule used to connect end faces of optical fibers, a method of manufacturing the connector ferrule, and an optical connector using the connector ferrule.

2. Related Background Art

As a connector used for a connection of a plurality of optical fibers, an optical connector of the type standardized by JIS C 5981 is generally known. An optical connector of this type is manufactured by using a mold like the one disclosed in Japanese Patent Laid-Open No. 8-179161. As shown in FIGS. 17 and 18, an optical connector C is of a type designed to position and fix optical fibers with a connector ferrule 1. As shown in FIG. 17, this connector ferrule 1 is mounted on the end portion of a fiber optic ribbon cable 2. A pair of guide-pin holes 11 are formed in a mating end face 10 to be connected with another optical connector C. Guide pins 3 for positioning and fixing the mating end faces of the two connectors are inserted in the guide-pin holes 11. These guide-pin holes 11 extend through the connector ferrule I from the mating end face 10 to the reverse end. The end portions of fiber positioning holes 13 for positioning the optical fibers in the fiber optic ribbon cable 2 are also formed in the mating end face 10. The optical connectors C described above are mutually positioned by inserting the common guide pins 3 into the guide-pin holes 11 and coupled to each other, as shown in FIG. 18. The coupled state of the two connectors is held by a clamp spring 5.

SUMMARY OF THE INVENTION

Optical connectors of this type are used for optical connection in a place where an optical communication line needs to be branched or switched. To switch connection, optical connectors must be detached/attached. It is required for such optical connectors that connection loss variations be small even if the connectors are repeatedly detached/attached.

It is, therefore, an object of the present invention to provide an optical connector which causes little connection loss variations even with repetitive detachment/attachment, a connector ferrule for the optical connector, and a method of manufacturing the optical connector ferrule.

In order to achieve the above object, an optical connector ferrule according to the present invention comprises: a ferrule body made from a resin by molding and having a mating end face, at least one fiber receiving hole and a pair of guide-pin holes, each of them extending from the mating end face toward the other end of the ferrule body, wherein the diameter of the guide-pin holes gradually increases toward the mating end face at a predetermined portion near the mating end face.

According to the optical connector using this connector ferrule, when a guide pin is to be inserted into the guide-pin hole from the mating end side, since the diameter of the guide-pin hole gradually increases toward the mating end, the guide pin can be easily and smoothly inserted into the guide-pin hole. This can suppress damage to the connector ferrule or wear thereof by the guide pin, and hence can realize an optical connector which can maintain good transmission characteristics even if the connector is repeatedly detached/attached.

Preferably, each guide-pin hole has a cylindrical region between the enlarged region and the mating end face. A cylindrical region causes a desired enlarged region to be reliably formed in a resin molding process. Each extending length of the cylindrical region is preferably from 2 $\mu$m to 50 $\mu$m.

The enlarged region of each guide-pin hole may have a truncated cone shape, as defined by its wall, having an apical angle from 30° to 70°. The wall surface of the enlarged region of each guide-pin hole may be formed by a curved surface toward an inside of the guide-pin hole. The enlarged region of each guide-pin hole is preferably located within a range of 0.1 mm to 1.0 mm from the mating end.

When an enlarged region is formed in this manner, the formation of the enlarged region itself is facilitated, and a guide pin can be easily and reliably inserted into a guide-pin hole. This can reliably suppress damage to the connector ferrule or wear thereof by the guide pins, and easily realize an optical connector which can always maintain good transmission characteristics even with repetitive detachment/attachment.

An optical connector according to the present invention is an optical connector using these optical connector ferrules. This optical connector is comprised of a pair of optical fiber sets each including at least one optical fiber in equal numbers; a pair of optical connector ferrules each defined above, positioning and fixing the respective optical fiber set; and a pair of guide pins which are inserted into the guide-pin holes in the optical connector ferrules to butt-joint the mating end faces of the optical connector ferrules to each other.

According to this optical connector, since the guide pins can be easily and smoothly inserted, damage to the connector ferrules or wear thereof by the guide pins can be suppressed, and good transmission characteristics can always be maintained even with repetitive detachment/attachment.

A method of manufacturing an optical connector ferrule according to the present invention comprises the steps of (1) opposing an mating end-side core and a fiber-side core to each other in a mold and fastening them together so as to form a mold, the mating end-side core having a pair of guide-pin hole molding pins and a predetermined number of needle-like fiber receiving hole molding pins, each of the guide-pin hole molding pins having a base portion where the diameter increases toward the core body and said fiber-side core having a protruding portion for forming an opening of a ferrule; (2) filling the mold cavity with a resin; (3) forming a ferrule body having a pair of guide-pin holes and a predetermined number of fiber positioning holes by setting the resin; (4) sliding the mating end-side core and the fiber-side core in a direction in which the cores are to be separated from each other; and (5) taking out the ferrule body from the mold.

Alternatively, instead of step (1), the method of manufacturing the optical connector ferrule according to the present invention may have the step of (la) opposing an mating end-side core and a fiber-side core to each other in a mold and fastening them together so as to form a mold, the mating end-side core having a pair of guide-pin hole molding pins each having a base portion where the diameter increases toward the core body and said fiber-side core having a protruding portion for forming an opening of a ferrule.

According to these manufacturing methods, when guide-pin holes are formed in an optical ferrule body, enlarged regions can be easily and reliably formed on the mating end.

In addition, if the fiber-side core is further comprised of at least one pipe-like molding portion each for inserting the guide-pin hole molding pin or the fiber positioning hole pin on the mating end-side core then the mating end-side core and fiber-side core can be reliably fastened to each other. This improves operability in a connector ferrule molding process.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIGS. 17 and 18 are perspective views showing conventional optical connectors, in which FIG. 17 shows the connectors when they are not connected to each other, and FIG. 18 shows the connectors when they are connected to each other.

DESCRIPTION OF THE PREFERRED EMBODIMENTS

Figure 1:
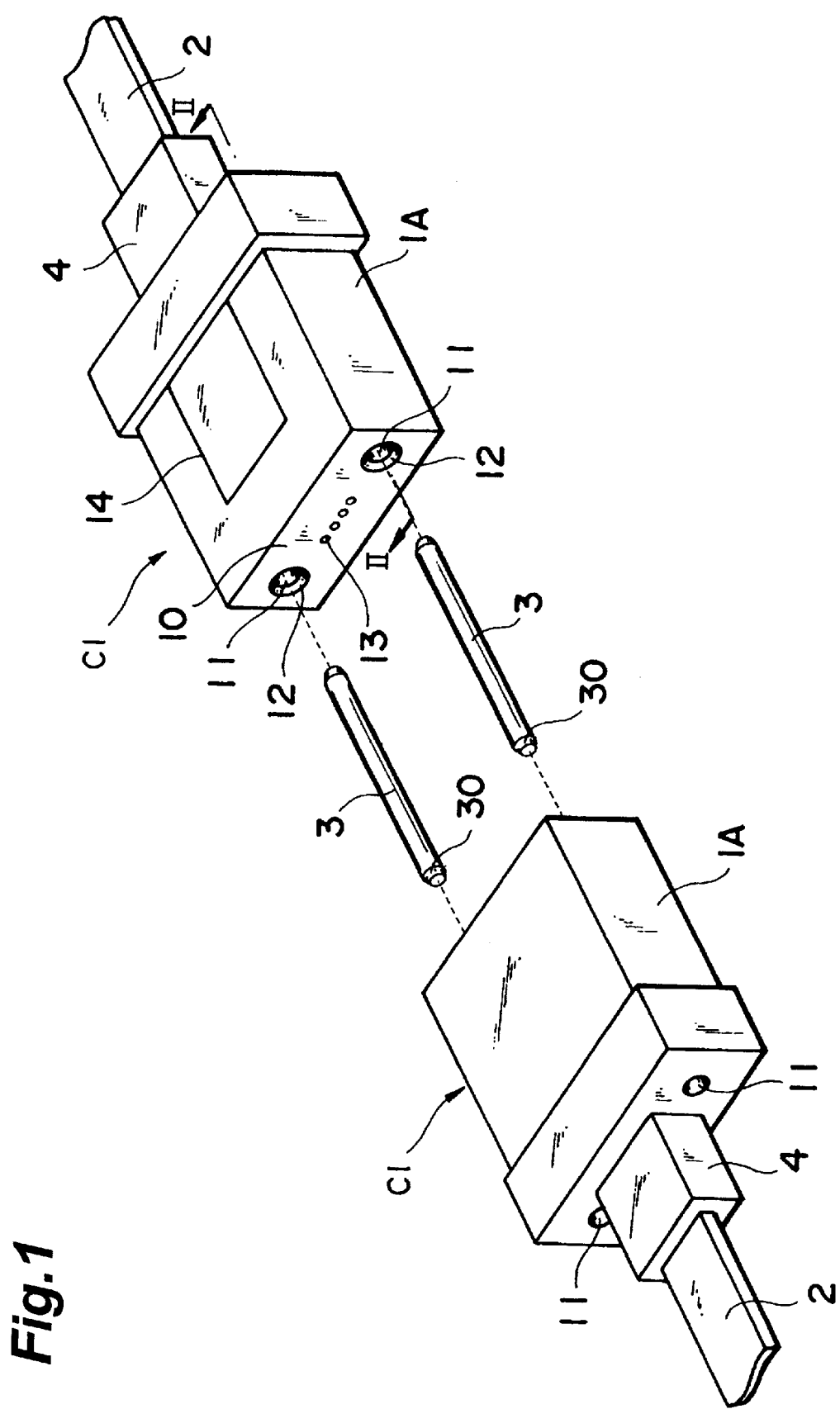
FIG. 1 is a perspective view showing the first embodiment of an optical connector according to the present invention.

The preferred embodiments of the present invention will be described in detail below with reference to the accompanying drawings. To facilitate the comprehension of the explanation, the same reference numerals denote the same parts, where possible, throughout the drawings, and a repeated explanation will be omitted.

Figure 2:
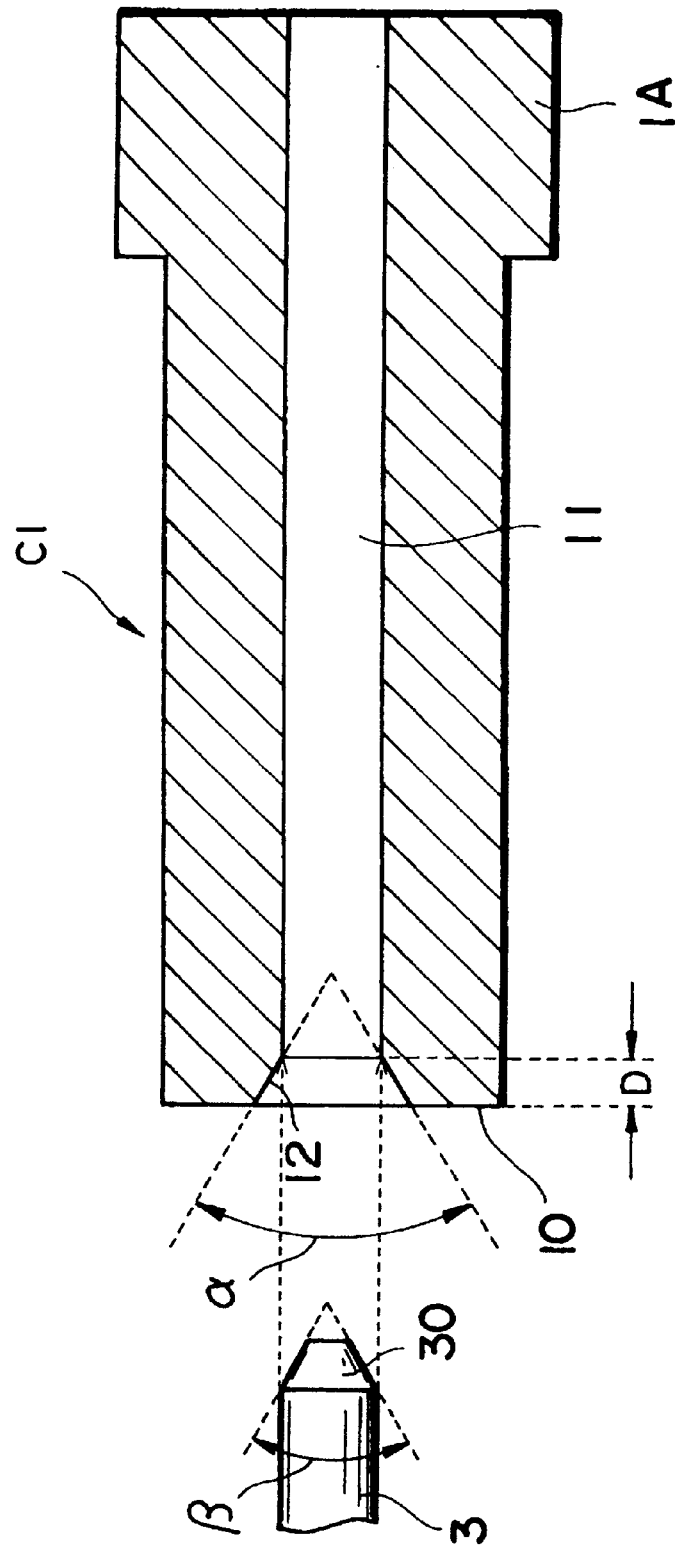
FIG. 2 is a sectional view taken along a line II—II in FIG. 1.

FIG. 1 is an exploded perspective view of the first embodiment of an optical connector according to the present invention. FIG. 2 is a sectional view taken along a line II—II in FIG. 1.

An optical connector C1 is formed by fixing the distal end of a fiber optic ribbon cable 2 to a connector ferrule 1A. The connector ferrule 1A has a pair of guide-pin holes 11 in a mating end face 10 to be butt-joined to another optical connector Cl. Positioning guide pins 3 are inserted in these guide-pin holes 11. The opening end portion of each guide-pin hole 11 is chamfered in a tapered shape to form an enlarged region 12 whose inner diameter gradually increases toward the mating end-side. Note that these guide-pin holes 11 are formed through the connector ferrule 1A from the mating end face 10 to the reverse end.

The opening end portions of fiber positioning holes 13 for positioning and fixing the respective optical fibers of the fiber optic ribbon cable 2 are arranged at predetermined intervals between the two guide-pin holes 11 in the mating end face 10 of the connector ferrule 1A. An adhesive filling opening portion 14 is formed in the upper surface of the connector ferrule 1A. The optical fibers are arranged respectively in the fiber positioning holes 13, and an adhesive is charged through the opening portion 14 and set. With this process, the arranged optical fibers, the fiber optic ribbon cable 2, and a boot 4 covering the fiber optic ribbon cable 2 are fixed to the connector ferrule 1A.

As shown in FIG. 2, the inner diameter of the enlarged region 12 formed at the opening end portion of the guide-pin hole 11 gradually increases toward the mating end face 10. The inner wall of the enlarged region 12 defines a truncated cone shape. The apical angle of this truncated cone shape, i.e., a chamfering angle a, is from 30° to 70°. A distance D from the mating end face 10 to the end face of the deepest portion of the enlarged region 12 is from 0.1 mm to 1.0 mm.

If the chamfering angle α is less than 30°, the difference between the maximum inner diameter (the inner diameter of the opening end portion) and the maximum diameter of the guide pin 3 becomes small. As a consequence, the end portion of the guide pin 3 is likely to come into contact with the mating end face 10. In this case, the guide pin 3 is likely to damage the periphery of the opening end portion of the enlarged region 12 on the mating end face 10.

If the chamfering angle α exceeds 70°, the difference between the maximum diameter of the enlarged region 12 and the maximum diameter of the guide pin 3 becomes large. As a consequence, the guide pin 3 is likely to come into contact with a portion near the minimum-diameter portion of the enlarged region 12. In this case, the guide pin 3 is likely to damage the portion near the minimum-diameter portion of the enlarged region 12. In addition, it is difficult to guide the guide pin 3 into the guide-pin hole 11. If the chamfering angle α exceeds 70°, since the maximum-diameter portion of the enlarged region 12 becomes excessively large, the enlarged region 12 interferes with the fiber positioning holes 13 or the size of the connector ferrule 1A itself must be increased. That is, this arrangement is not practical.

The chamfering angle α is preferably set to 35° to 55°, in particular, within the above range, to simultaneously satisfy the two requirements, i.e., preventing the above damage due to contact with the guide pin 3 and efficiently inserting the guide pin 3 into the guide-pin hole 11. If the end portion of the guide pin 3 to be used has a tapered portion 30, the chamfering angle α is more preferably set to be within the above range and equal to or larger than a tapering angle β of the tapered portion 30.

If the formation range D from the mating end face 10 of the enlarged region 12 is less than 0.1 mm, the end portion of the guide pin 3 cannot be satisfactorily guided, and a portion near the enlarged region 12 is likely to be damaged by contact with the guide pin 3. If the formation range D exceeds 1.0 mm, since the holding force for the guide pin 3 decreases on the mating end face 10 side, the connection loss characteristics may deteriorate. In addition, if the formation range D exceeds 1.0 mm, since the maximum-diameter portion of the enlarged region 12 becomes excessively large, the enlarged region 12 interferes with the fiber positioning holes 13 or the size of the connector ferrule 1A itself must be increased. That is, this arrangement is not practical.

Table 1 shows the test results obtained by testing connection loss variations before and after guide pins were inserted/removed, 200 times each, in/from optical connector ferrules having different chamfering angles α and different formation ranges D.

| Shape of Chamfered Portion | | Connection |
| --- | --- | --- |
| Chamfering Angle α (°) | Formation Range D (mm) | Loss Variation (dB) |
| 20 | | 0.25 |
| 30 | | 0.2 |
| 40 | | 0.15 |
| 50 | 0.3 | 0.15 |
| 60 | | 0.15 |
| 70 | | 0.2 |
| 80 | | 0.3 |
| 60 | 0.05 | 0.3 |
| | 0.15 | 0.2 |
| | 0.3 | 0.15 |
| | 0.7 | 0.15 |

Table 1 Test Results on Connection Variations As is obvious from this table, when the chamfering angle α is within the range of 30° to 70°, or the formation range D is within the range of 0.1 mm to 1.0 mm, the connection loss variations are small (i.e., no deterioration in connection loss characteristics occurs, and good transmission characteristics can be stably obtained).

Figure 3A:
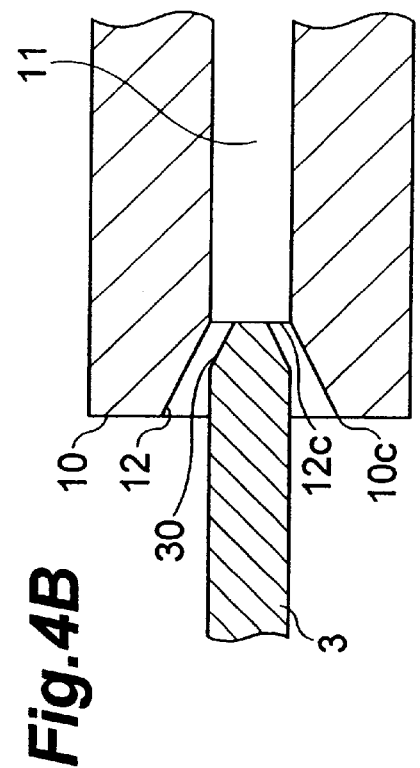
FIGS. 3A and 4A are views for explaining insertion of a guide pin of a conventional optical connector.
Figure 3B:
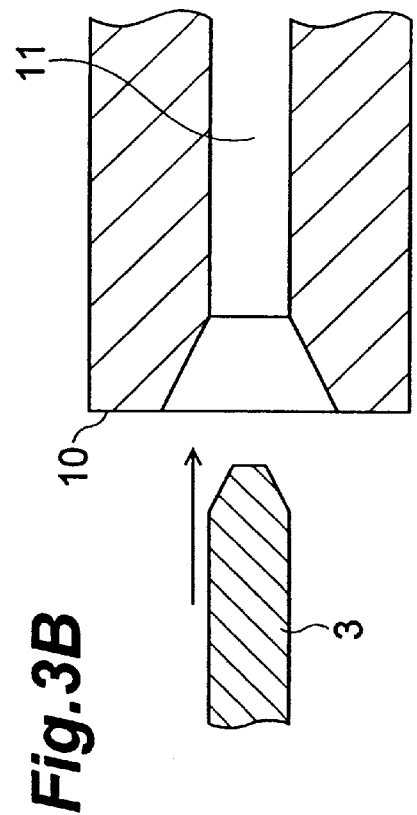
FIGS. 3B and 4B are views for explaining insertion of a guide pin of the optical connector according to the present invention.
Figure 4A:
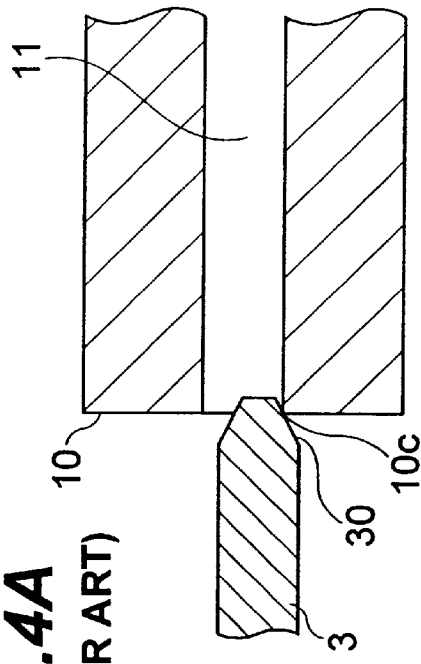
Figure 4B:
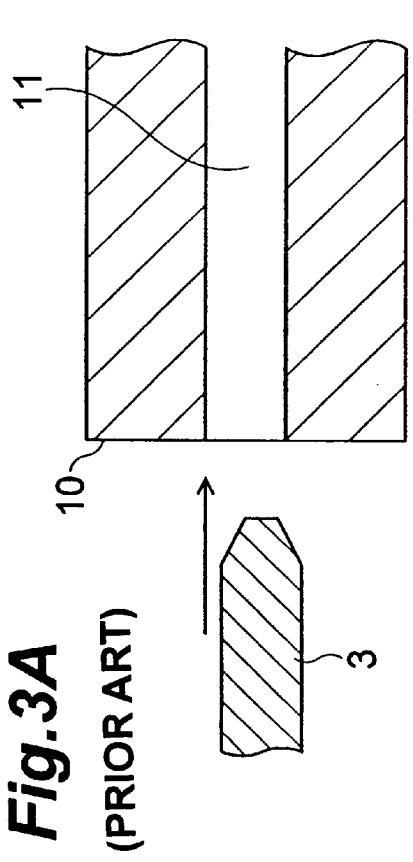
Figure 17:
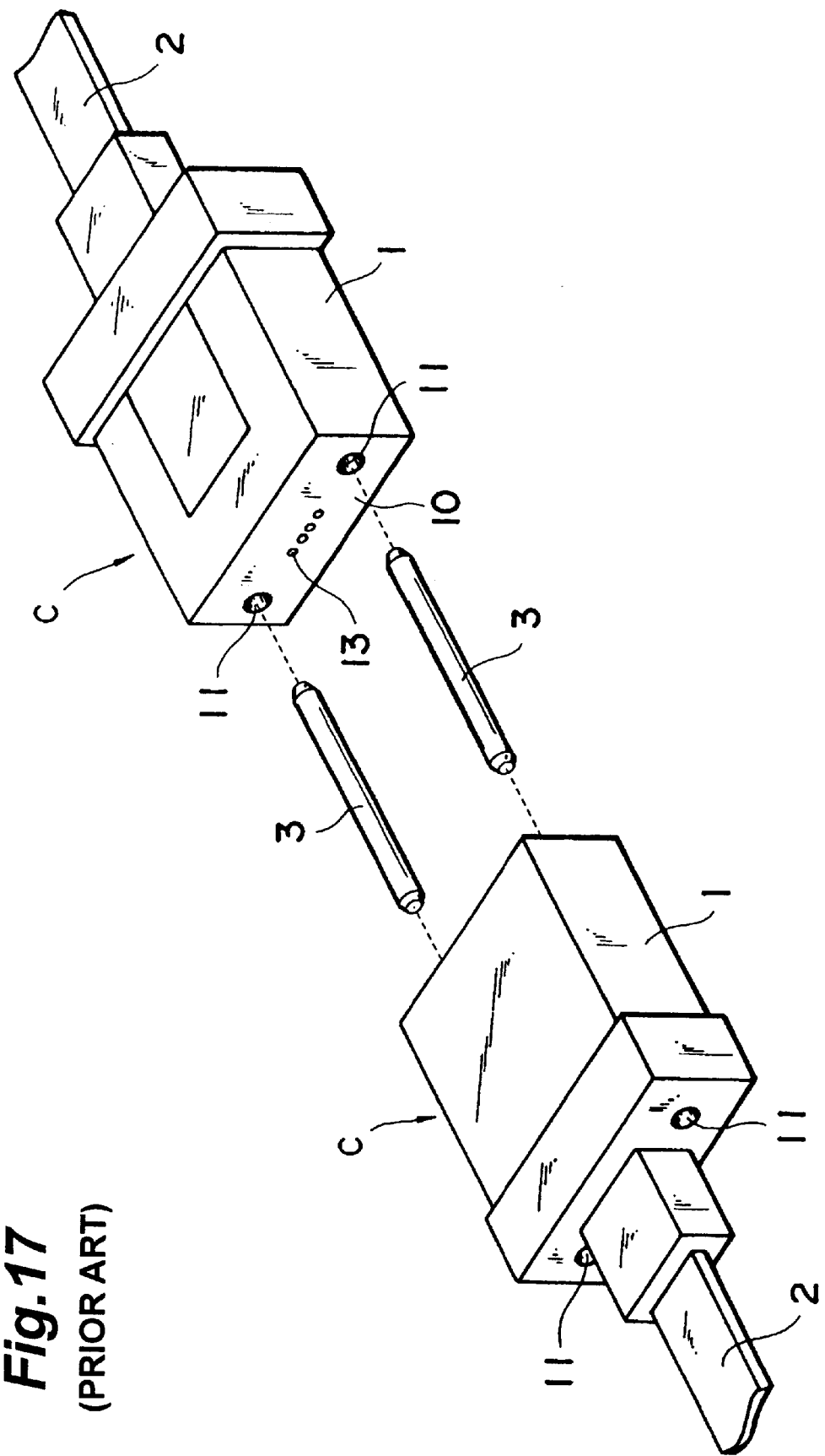
Figure 18:
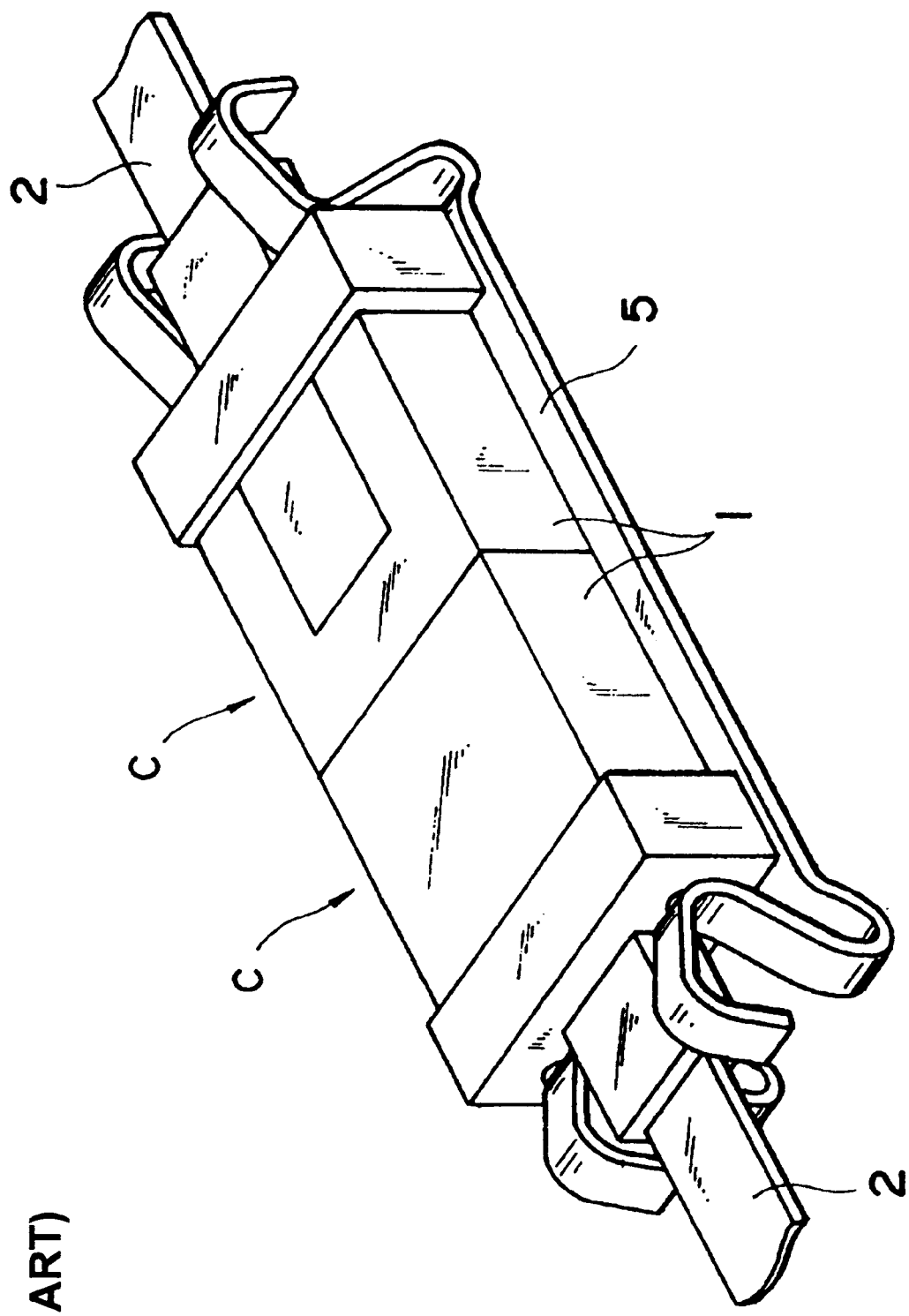

Insertion of the guide pin 3 into the guide-pin hole 11 in the optical connector according to the present invention in FIG. 1 will be described below in comparison with the conventional optical connector in FIG. 17 with reference to FIGS. 3A, 3B, 4A, and 4B. FIGS. 3A and 4A are views for explaining insertion of the guide pin 3 into the guide-pin hole 11 in the conventional optical connector. FIGS. 3B and 4B are views for explaining insertion of the guide pin 3 into the guide-pin hole in the optical connector according to the present invention.

As shown in FIG. 3A, the diameter of the guide-pin hole 11 of the conventional optical connector remains unchanged up to the opening end portion of the mating end face 10. If, therefore, the position of the guide pin 3 is offset from the guide-pin hole 11, the guide pin 3 is difficult to insert. Even if the guide pin 3 can be inserted, an edge 10c of the opening end portion is likely to chip.

In the case of an optical connector 1C according to the present invention, which uses the above connector ferrule 1A, the guide pin 3 can be smoothly guided from the enlarged region 12 into the guide-pin hole 11, as shown in FIG. 3A. In addition, even if the position of the guide pin 3 is offset from the guide-pin hole 11, an edge 10c of the opening end portion or an edge 12c of the deepest portion of the enlarged region 12 is not likely to chip, as shown in FIG. 4B. This can prevent the guide pin 3 from damaging or wearing the connector ferrule 1A, and hence good transmission characteristics can be obtained. In addition, since the guide pin 3 can be smoothly guided into the guide-pin hole 11 owing to the enlarged region 12, wear of the inner surface of the guide-pin hole 11 due to the guide pin 3 can be suppressed. Even if, therefore, the guide pin 3 is repeatedly inserted and removed, almost no connection loss variation occurs.

When the connector is repeatedly attached/detached, the guide pin 3 is repeatedly inserted/removed in/from the guide-pin hole 11. In the case of the conventional optical connector, if the position of the guide-pin hole 11 in the optical connector is slightly offset, the guide pin 3 is pressed against the side surface of the guide-pin hole 11, resulting in deformation of the ferrule body. As a result, a burr 10x is formed on the edge of the opening end of each mating end, as shown in FIG. 5A. This burr 10x makes it more difficult to re-insert the guide pin 3 into the guide-pin hole 11. Furthermore, since the burrs protrude from the mating end faces 10, a gap is produced between the mating end faces 10. This may hinder reliable optical connection.

Figure 5B:
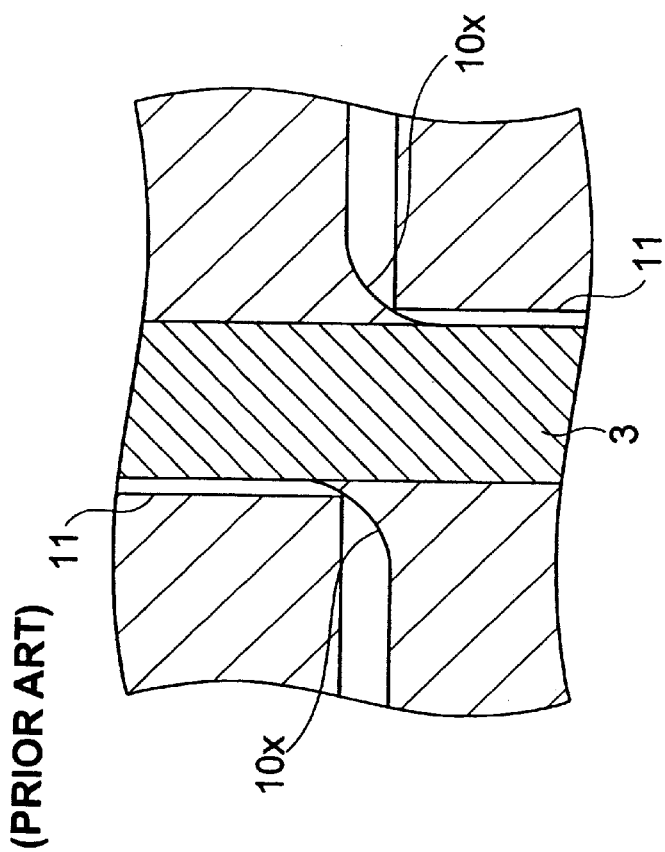
FIG. 5B is a view for explaining how the position of a guide pin is offset from a guide-pin hole in the optical connector according to the present invention.
Figure 5A:
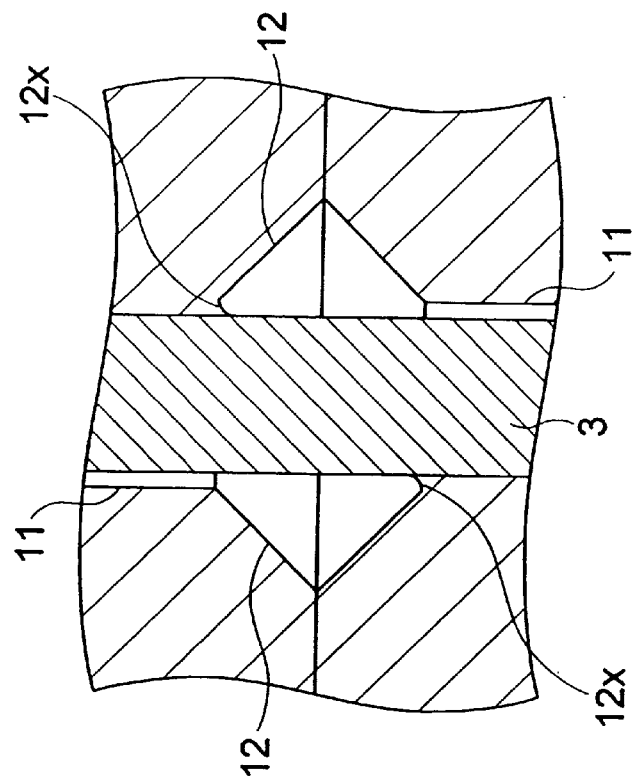
FIG. 5A is a view for explaining how the position of a guide pin is offset from a guide-pin hole in the conventional optical connector.

In contrast to this, if the position of the guide-pin hole 11 in the optical connector according to the present invention is offset, a burr 12x is formed on the edge of the deepest portion (minimum-diameter portion) of each enlarged region 12, as shown in FIG. 5B. This burr 12x is smaller than the burr 10x in the prior art, and has little influence on re-insertion of the guide pin 3. In addition, the burrs do not protrude to the mating end faces 10, and hence have no influence on contact between the mating end faces 10 of the optical connectors. This allows reliable optical connection.

Figure 6A:
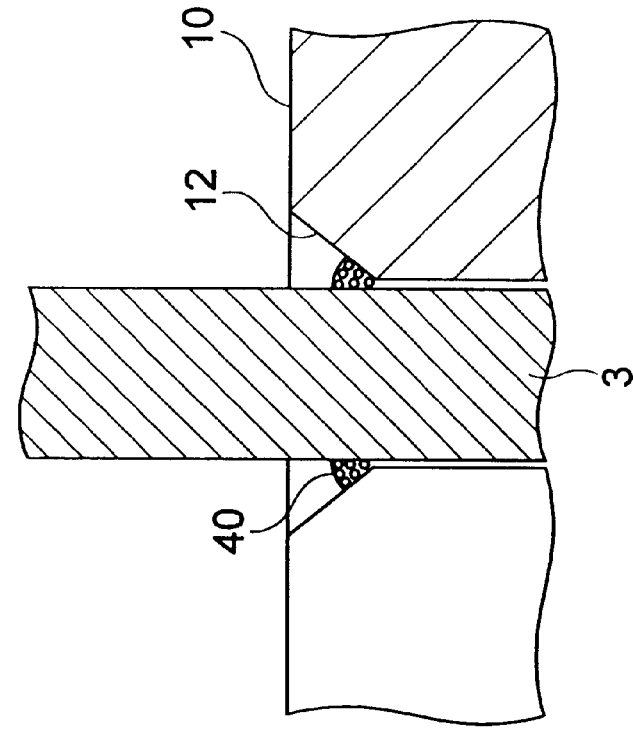
FIG. 6A is a view for explaining how a mating end of the conventional optical connector is cleaned.

Assume that each optical connector 1C is to be disconnected to clean the mating end face 10. In the case of the conventional optical connector, if the guide pin 3 is kept inserted in the guide-pin hole 11, grime 40 on the mating end face 10 stays around the guide pin 3 and cannot be completely removed, as shown in FIG. 6A. This produces a gap between the mating end faces 10 when they are coupled to each other again, and hinders reliable optical connection. For this reason, the end faces must be cleaned after the guide pins 3 are removed.

Figure 6B:
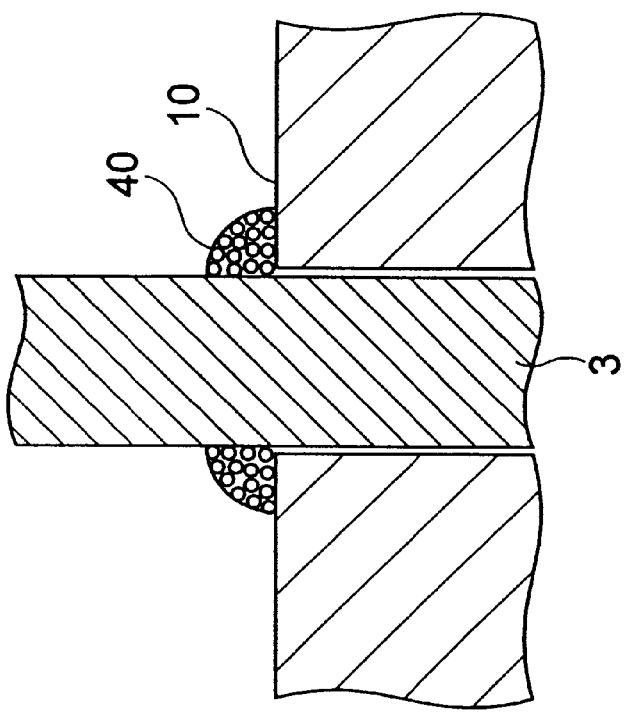
FIG. 6B is a view for explaining how a mating end of the optical connector according to the present invention is cleaned.

In the case of the optical connector according to the present invention, as shown in FIG. 6B, since no grime 40 stays on the mating end face 10, there is no influence of grime on contact between the mating end faces 10 of the optical connectors, and reliable optical connection can be performed. This improves operability in cleaning. In addition, since the guide pins 3 need not be frequently inserted/removed, problems due to insertion/removal of the guide pins 3 can be prevented.

Figure 7A:
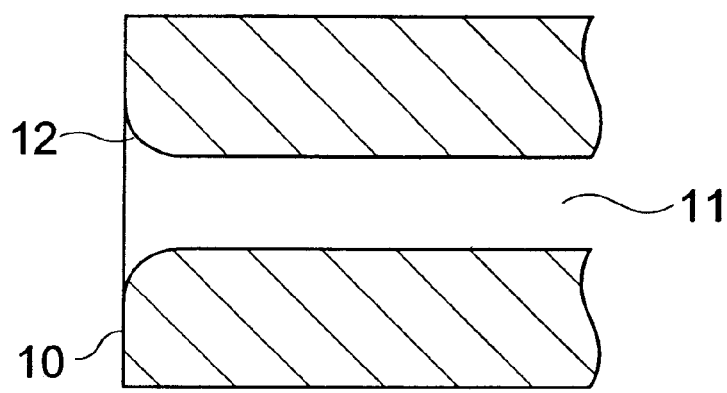
FIGS. 7A to 7C are sectional views showing the enlarged regions of guide-pin holes which are located near mating end faces.
Figure 7B:
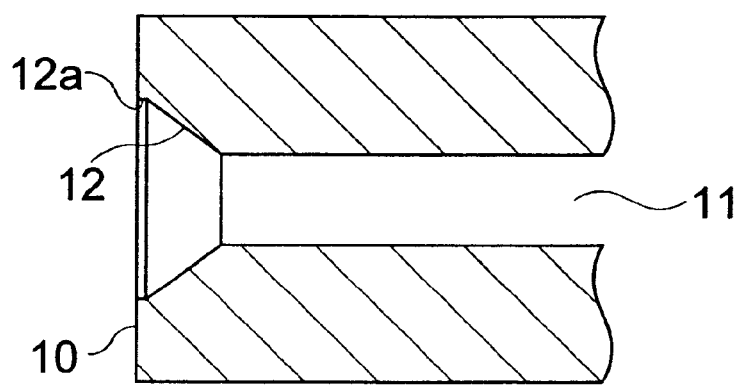
Figure 7C:
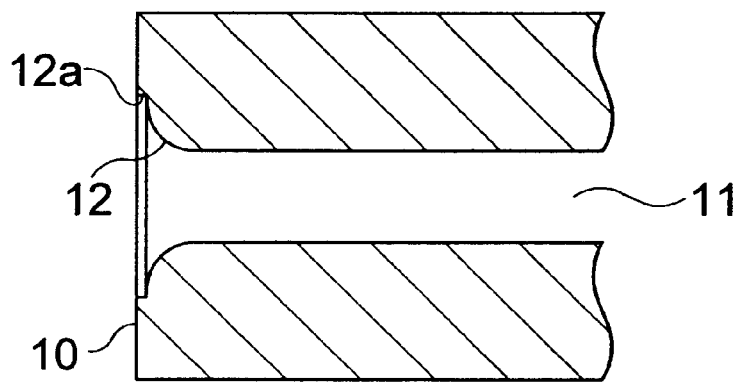

FIGS. 7A to 7C are sectional views each showing a modification of the enlarged region 12. According to the modification shown in FIG. 7A, the inner wall of the guide-pin hole 11 is chamfered in a curved shape on the opening end portion side. In this state, since contact between the guide pin and the inner wall surface can be further suppressed as compared with the guide-pin hole having the tapered enlarged region, damage to the connector ferrule can be prevented more effectively.

FIGS. 7B and 7C respectively show modifications of the embodiments shown in FIGS. 2 and 7A. Each modification consists in that a cylindrical region 12a having almost the same inner diameter as that of the enlarged region 12 is formed on the mating end face 10 side. This cylindrical region 12a is preferably formed to reliably form the enlarged region 12 in the guide-pin hole 11 on the mating end face 10 side.

Figure 8:
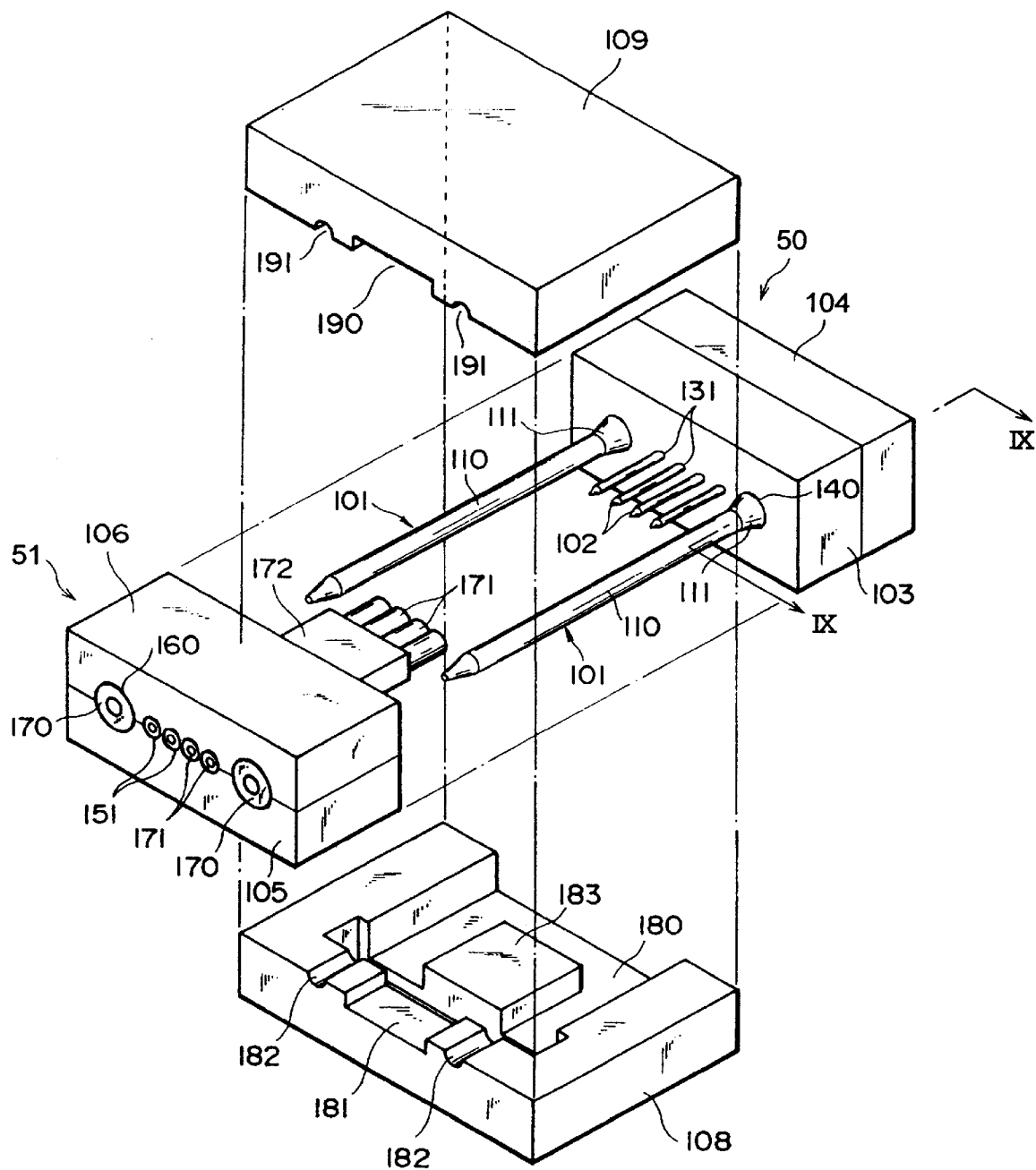
FIG. 8 is an exploded perspective view showing a mold for molding the optical connector ferrule shown in FIG. 1.
Figure 9:
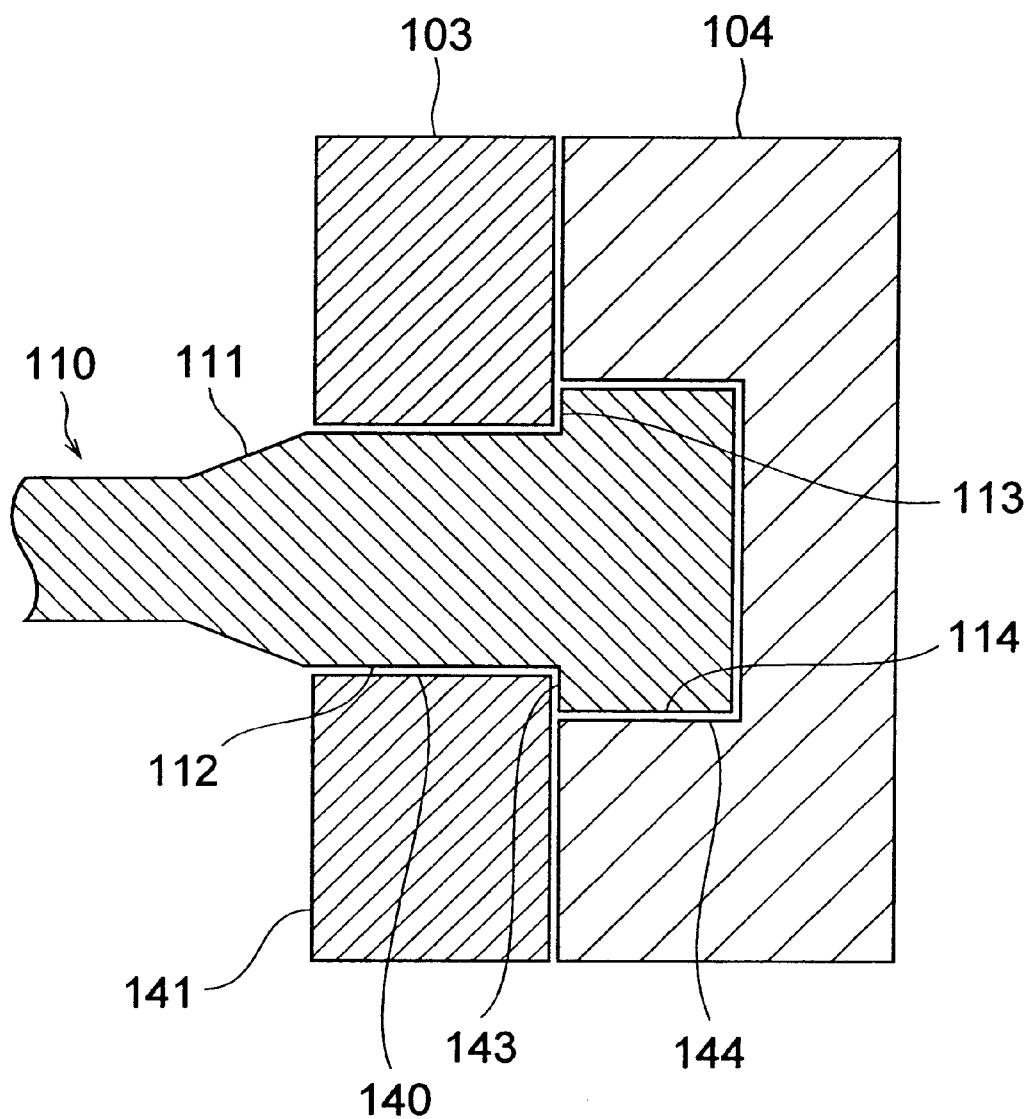
FIG. 9 is a sectional view taken along a line IX—IX in FIG. 8.

A manufacturing process for this optical connector ferrule will be described next with reference to FIG. 8. FIG. 8 is an exploded perspective view of a mold used to mold the connector ferrule 1A of the optical connector 1C in FIG. 1. FIG. 9 is a sectional view taken along a line IX—IX in FIG. 8.

This mold is made up of a pair of lower and upper mold parts 108 and 109. An mating end-side core 50 and fiber-side core 51 are fastened to each other between these mold parts 108 and 109. A pair of guide-pin-hole pins 101 and fiber-hole pins 102 are arranged on the mating end-side core 50. Each of the pair of guide-pin-hole pins 101 has a columnar portion 110 having almost the same diameter as the diameter of the guide-pin hole 11 in the molded connector ferrule 1A, and a truncated cone portion 111 formed on the proximal end side of the columnar portion 110 to have a gradually increasing diameter. As shown in FIG. 9, a columnar portion 112 having a uniform diameter is further formed on the proximal end side of the truncated cone portion 111, and a flange portion 114 having an outer diameter larger than that of the columnar portion 112 is also formed on the proximal end side of the columnar portion 112.

The four fiber-hole pins 102 each having almost the same diameter as the diameter of each of fiber positioning holes 131 in the molded connector ferrule 1A are arranged between the pair of guide-pin-hole pins 101. Each fiber-hole pin 102 has a flange portion like the guide-pin-hole pin 101. The proximal end sides of these pins 101 and 102 are respectively inserted in hole portions 140 and the hole portions 131 formed in a first holding member 103 and accurately positioned and fixed, thus forming the mating end-side core 50.

More specifically, the proximal end portions of the respective pins 101 and 102 are inserted into the holes 140 and 131, which are formed through the first holding member 103 at predetermined intervals, up to the end portions. The diameter of the hole 140 is nearly equal to the diameter of the columnar portion 112 of the guide-pin-hole pin 101. The diameter of the hole 131 is nearly equal to the diameter of the columnar portion of the fiber-hole pin 102. The collar portions formed on the end portions of the pins 101 and 102 are clamped between a rear end face 143 of the first holding member 103 and a recess 144 formed in the front end face of a second holding member 104, thereby positioning and fixing the respective pins.

In this case, it is preferable that a portion of the guide-pin-hole pin 101 which has the maximum diameter on the proximal end portion side, i.e., a boundary portion with respect to the columnar portion 112, slightly protrude from a holding surface position corresponding to a front end face 141 of the first holding member 103. This is because, when the maximum-diameter portion slightly protrudes from the front end face 141, the guide-pin hole 11 in the formed connector ferrule has the shape shown in FIG. 7B, which allows the enlarged region 12 to be reliably formed. This protrusion amount is preferably set to 2 μm to 50 μm in consideration of an error in molding. If a margin of 2 μm is set in consideration of an actual mounting error and the like, the enlarged region 12 can be reliably formed in the formed connector ferrule. If, however, the protrusion amount exceeds 50 μm, the cylindrical region becomes excessively long. This poses a problem from the viewpoint of molding.

The fiber-side core 51 has cylindrical bodies 170 and 171 for bearing the distal ends of the guide-pin-hole pins 101 and fiber-hole pins 102 at positions corresponding to the pins 101 and 102. The pair of first cylindrical bodies 170 for bearing the distal ends of the guide-pin-hole pins 101 are fixed by being clamped between a third holding member 105 and fourth holding member 106. The inner diameter of the first cylindrical body 170 is nearly equal to the diameter of the columnar portion 110 of the guide-pin-hole pin 101. The first cylindrical body 170 holds the inserted columnar portion 110 and positions it. Each first cylindrical body 170 itself is accurately positioned and fixed in a cylinder 160 formed by combining semicircular grooves formed in the opposing surfaces of the third holding member 105 and fourth holding member 106.

The four second cylindrical bodies 171 for bearing the distal ends of the fiber-hole pins 102 are arranged between the pair of first cylindrical bodies 170. These second cylindrical bodies 171 are also fixed by being clamped between the third holding member 105 and fourth holding member 106. The second cylindrical bodies 171 protrude from the third holding member 105 and fourth holding member 106 toward the first holding member 103 and second holding member 104. The middle portions of the second cylindrical bodies 171 extend through a rectangular portion 172.

The inner diameter of the second cylindrical body 171 is nearly equal to the diameter of the fiber-hole pin 102. The second cylindrical body 171 holds the inserted fiber-hole pin 102 and positions it. Like each first cylindrical body 170, each second cylindrical body 171 is accurately positioned and fixed in a cylinder 151 formed by combining semicircular grooves formed in the opposing surfaces of the third holding member 105 and fourth holding member 106.

Recesses 180 (not shown on the upper mold part 109 side) for forming the connector ferrule 1A are formed in the inner surfaces of the lower mold part 108 and upper mold part 109. A projection 183 for forming the opening portion 14 is formed in the recess 180 of the lower mold part 108. Rectangular notched portions 181 and 190 for allowing the rectangular portion 172 to be inserted through and semicircular notched portions 182 and 191 for bearing columnar portions 110 of the guide-pin-hole pins 101 are formed in the lower mold part 108 and upper mold part 109 on the side where the third holding member 105 and fourth holding member 106 are located.

When the connector ferrule 1A is to be molded by using the above mold, the lower mold part 108 and upper mold part 109 are closed, and the mating end-side core 50 and fiber-side core 51 are arranged in a fastened state between these mold parts. The distal ends of the guide-pin-hole pins 101 are inserted into the first cylindrical bodies 170 through the circular holes formed by the semicircular notched portions 182 and 191, whereas the distal ends of the fiber-hole pins 102 are inserted into the second cylindrical bodies 171 and fixed. The rectangular portion 172 is guided into the mold parts 108 and 109 through the rectangular notched portions 181 and 190, and the lower surface of the rectangular portion 172 comes into contact with the upper surface of the projection 183.

The mold parts 108 and 109 are then filled with a molten resin. The resin is cooled and set. The guide-pin holes 11 are formed by the columnar portions 110, and the enlarged regions 12 are formed by the truncated cone portions 111. The fiber positioning holes 13 are formed by the fiber-hole pins 102, and the opening portion 14 are formed by the projection 183 and rectangular portion 172. When the resin in the mold parts 108 and 109 are set, the mating end-side core 50 and fiber-side core 51 are slid in the direction in which they are separated from each other, thereby removing the guide-pin-hole pin 101 and the like from the mold parts 108 and 109. The lower mold part 108 and upper mold part 109 are then opened to extract the molded connector ferrule 1A.

When the guide-pin-hole pins 101 are to be pulled out, the columnar portions 110 are only pulled out toward the truncated cone portion 111 side to prevent the formation of so-called undercut portions. For this reason, the enlarged regions 12 may be formed in the molded connector ferrule 1A by using a slide core structure for forming the guide-pin holes 11 and fiber positioning holes 13. That is, there is no need to newly form a complicated slide core structure to form the enlarged regions 12.

According to the above manufacturing method, the enlarged regions 12 can be efficiently and accurately formed on the opening end portions of the guide-pin holes 11 in the connector ferrule 1A. According to the molded connector ferrule 1A, as described above, the optical connector Cl can be realized, which can suppress damage to the connector ferrule 1A and wear thereof by the guide pins 3, has good transmission characteristics, and is almost free from connection loss variations even with repetitive attachment/detachment.

Figure 10:
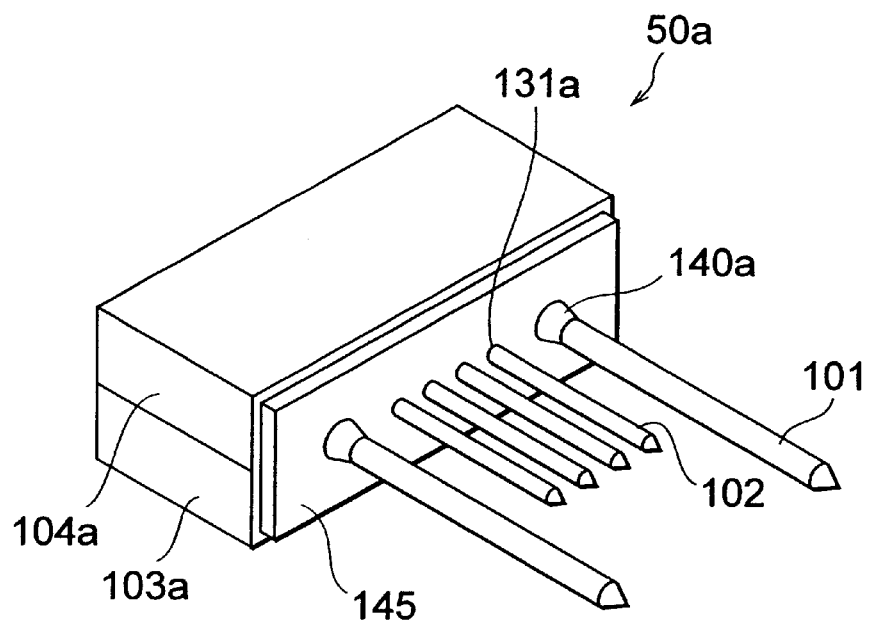
FIG. 10 is a perspective view showing another embodiment of an mating end-side core for forming the optical connector ferrule according to the present invention.
Figure 11:
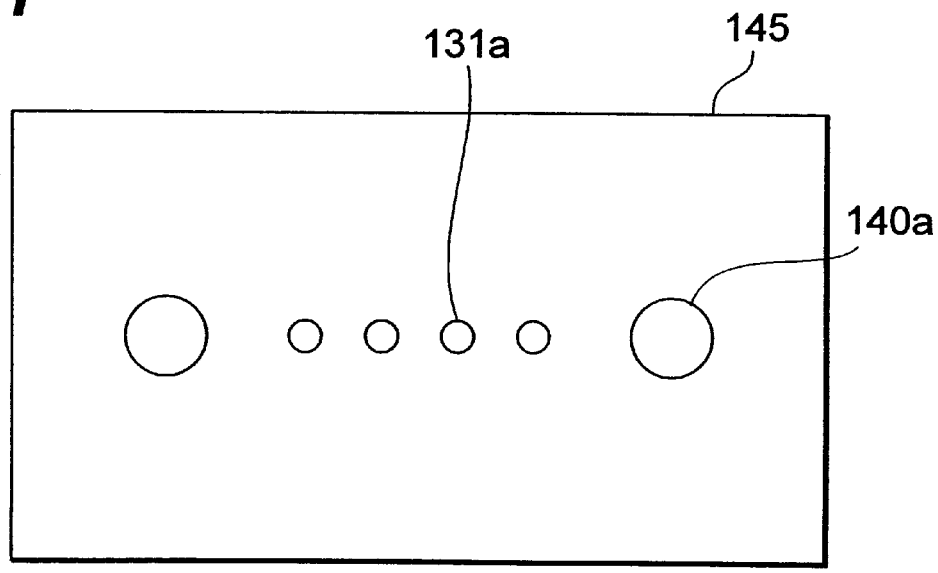
FIG. 11 is a front view of a plate-like member used for core of FIG. 10.

As a structure for mounting the pins 101 and 102 on the mating end-side core 50, a mating end-side core 50a shown in FIG. 10 may be used instead of the structure shown in FIG. 8. Similar to the fiber-side core 51 shown in FIG. 8, the mating end-side core 50a is designed such that the pins 101 and 102 are fixed by being clamped between a lower member 103a and upper member 104a. A planar plate 145 for preventing the intrusion of a resin, which has holes 140a through which the guide-pin-hole pins 101 extend and holes 131a through which the fiber-hole pins 102 extend, is disposed on the side where the pins 101 and 102 protrude, as shown in FIG. 11. This can effectively prevent the formation of burrs on an end portion of a molded resin member due to the intrusion of the molding resin into the gap between the lower member 103a and upper member 104a.

The intrusion of a molding resin into the gap portion between the upper member 104a and lower member 103a can also be prevented by filling the gap portion with a heat-resistant adhesive, solder, or the like instead of disposing the plate 145. This can prevent burrs and the like from being left on an end portion of the molded resin member.

To form the enlarged regions 12 of the guide-pin holes 11, the truncated cone portions 111 of the guide-pin-hole pins 101 need to be formed on the mating end-side core 50. However, the structures of the mating end-side core 50 and fiber-side core 51 are not limited to those shown in FIG. 8.

Figure 12A:
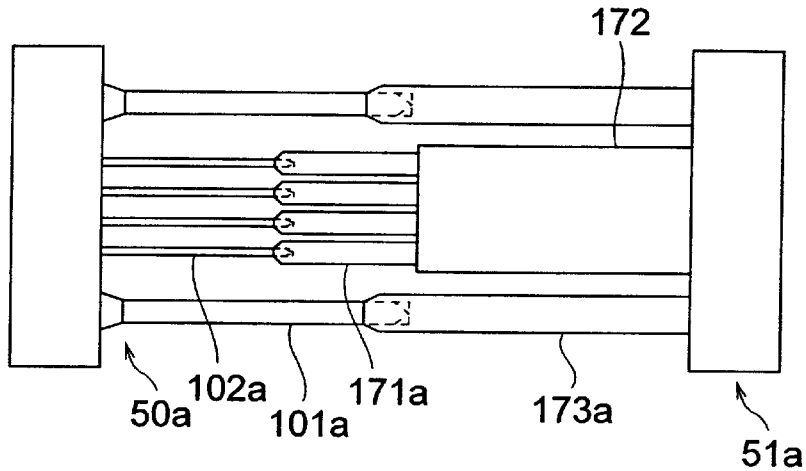
FIGS. 12A to 12C are plan views respectively showing other embodiments of the mating end-side core and fiber-side core for forming the optical connector ferrule according to the present invention.
Figure 12B:
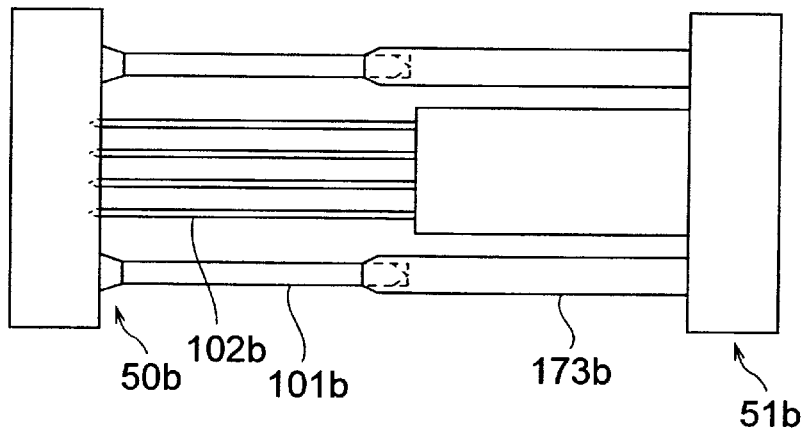
Figure 12C:
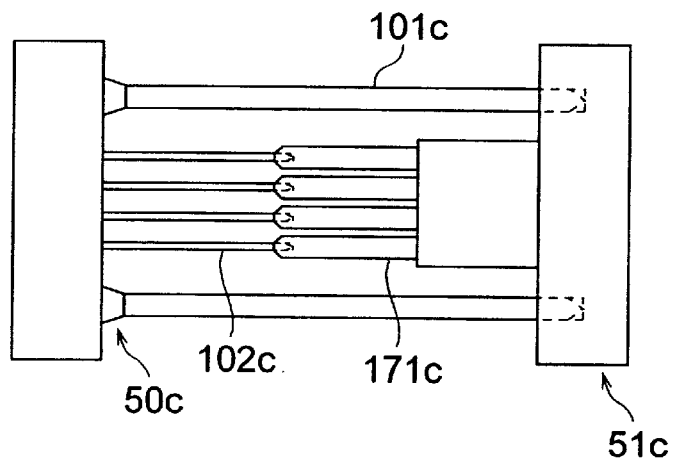

FIGS. 12A to 12C are plan views showing other embodiments of the mating end-side core and fiber-side core.

Figure 13A:
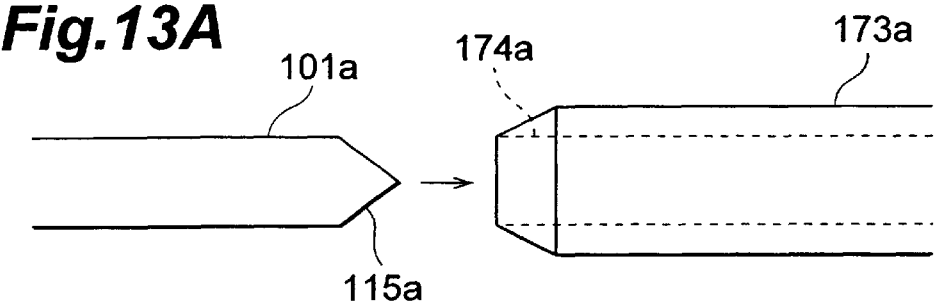
FIG. 13A is a view showing the relationship between a molding pin for molding a guide-pin hole and pipe of the core shown in FIGS. 12A, and 13B is a view showing another embodiment of the pipe.

The embodiment shown in FIG. 12A is characterized in that a fiber-side core 51a has larger guide-pin-hole forming pins 173a for accommodating the distal ends of guide-pin-hole pins 101a at positions opposing the guide-pin-hole pins 110a. FIG. 13A is an enlarged view of the distal end portions of the guide-pin-hole pin 110a and larger guide-pin-hole forming pin 173a.

Figure 13B:
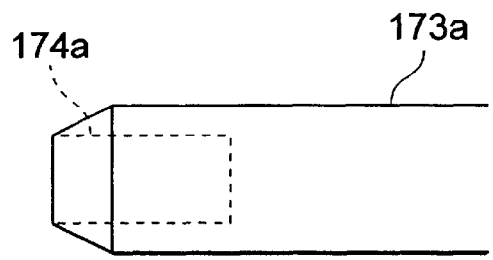

As shown in FIG. 13A, a distal end 115a of the guide-pin-hole pin 101a is sharpened at 60° or less and shaped to be easily inserted into a hole 174a axially extending through the pin 173a. The diameter of the hole 174a is slightly larger than the diameter of the pin 110a. The distal end of the pin 173a is also tapered at 60° or less. As shown in FIG. 13A, the hole 174a may axially extend through the pin 173a or be formed in only the distal end portion of the pin 173a, as shown in FIG. 13B. In this case, the difference between the diameter of the pin 110a and the diameter of the hole 174a of the pin 173a is preferably set to 10 $\mu$m or less. If the difference is larger than 10 $\mu$m, a molding resin may enter the gap.

Figure 14A:
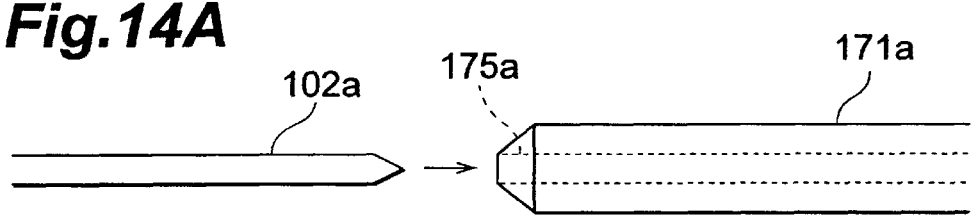
FIG. 14A is a view showing the relationship between a pin for molding a fiber positioning hole and pipe of the core shown in FIGS. 12A, and 14B is a view showing another embodiment of the pipe.
Figure 14B:
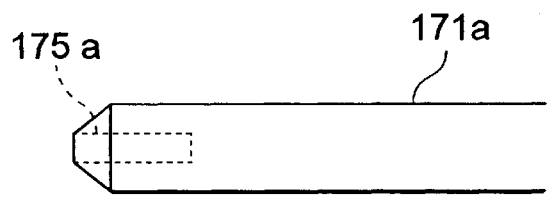

FIGS. 14A and 14B are enlarged views of the distal end portions of a pin 102a and a pin 171a. As shown in FIG. 14A, like the pin 101a in FIG. 13A, the pin 102a is sharpened at 60° or more and shaped to be easily inserted into a hole 175a axially extending through a pipe 171a. The diameter of the hole 175a is slightly larger than the diameter of the pin 102a. The difference between these diameters is preferably set to 10 $\mu$m or less. The distal end of the pin 171a is also tapered at 60° or less.

In addition, the thickness of the tapered portion of the distal end of the pin 171a is preferably set to 5 $\mu$m or less to prevent the formation of a step between the tapered surface of the distal end of the pin 171a and the pin 102a when the pin 102a is inserted into the hole 175a of the pin 171a.

Note that the hole 175a of the pin 171a may extend through the pipe, as shown in FIG. 14A, or be formed in only the distal end of the pin, as shown in FIG. 14B.

If at least one of the holes 174a or 175a pins 171a and 173a formed in the fiber-side core 51, or the effect of letting the gas produced from the molding resin injected from the cavity portion into the mold escape outside the mold.

The embodiment shown in FIG. 12B differs from that shown in FIG. 12A in that pins 102b for molding fiber positioning holes extend from a fiber-side core 51b. Referring to FIG. 12B, the molding portion of each pin 102b has a uniform diameter. However, each pin 102b may have a two-step structure having a portion with a larger diameter on the proximal end side. This structure facilitates insertion of the fibers into the molded connector ferrule.

The embodiment shown in FIG. 12C differs from that shown in FIG. 12A in that only pins 171c for forming fiber positioning holes extend from a fiber-side core 51c. The fiber-side core 51c has holes at portions opposing guide-pin-hole pins 101c of an mating end-side core 50c, similar to the fiber-side core 51 in FIG. 8. With this structure, the distal end portions of the guide-pin-hole pins 101c are accommodated in such holes to be fastened.

According to the above description, the mating end-side cores and fiber-side cores are fastened to each other by inserting the distal end portions of the pins into the holes and fastening them. However, any pipe-like members may be used.

Figure 15A:
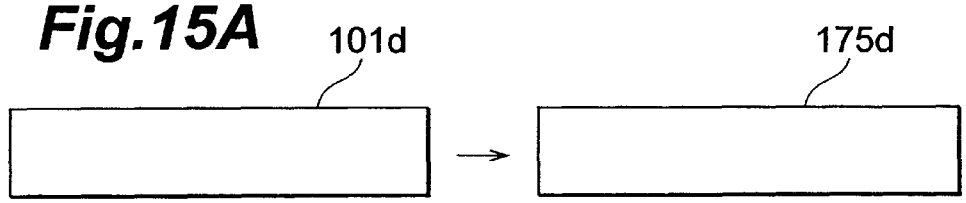
FIGS. 15A and 15B are views each for explaining alignment of pins for molding a guide-pin hole and fiber positioning hole, which extends from the mating end-side core and fiber-side core, respectively.
Figure 15B:
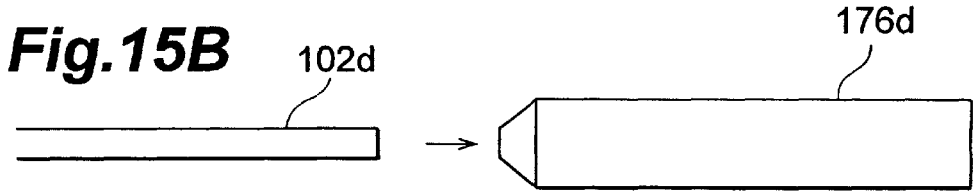

As shown in FIGS. 15A and 15B, the distal end of a pin 110d or 102d of a mating end-side core may be aligned with the distal end of a pin 176d or 177d of a fiber-side core such that the end faces come into contact with each other or spaced apart from each other through a gap of 10 μm or less. In this state, these components may be fixed by using upper and lower mold parts.

The optical connector ferrule according to the present invention can be satisfactorily manufactured by using any of the molds of these forms.

The second embodiment of the optical connector according to the present invention will be described next with reference to FIG. 16.

Figure 16:
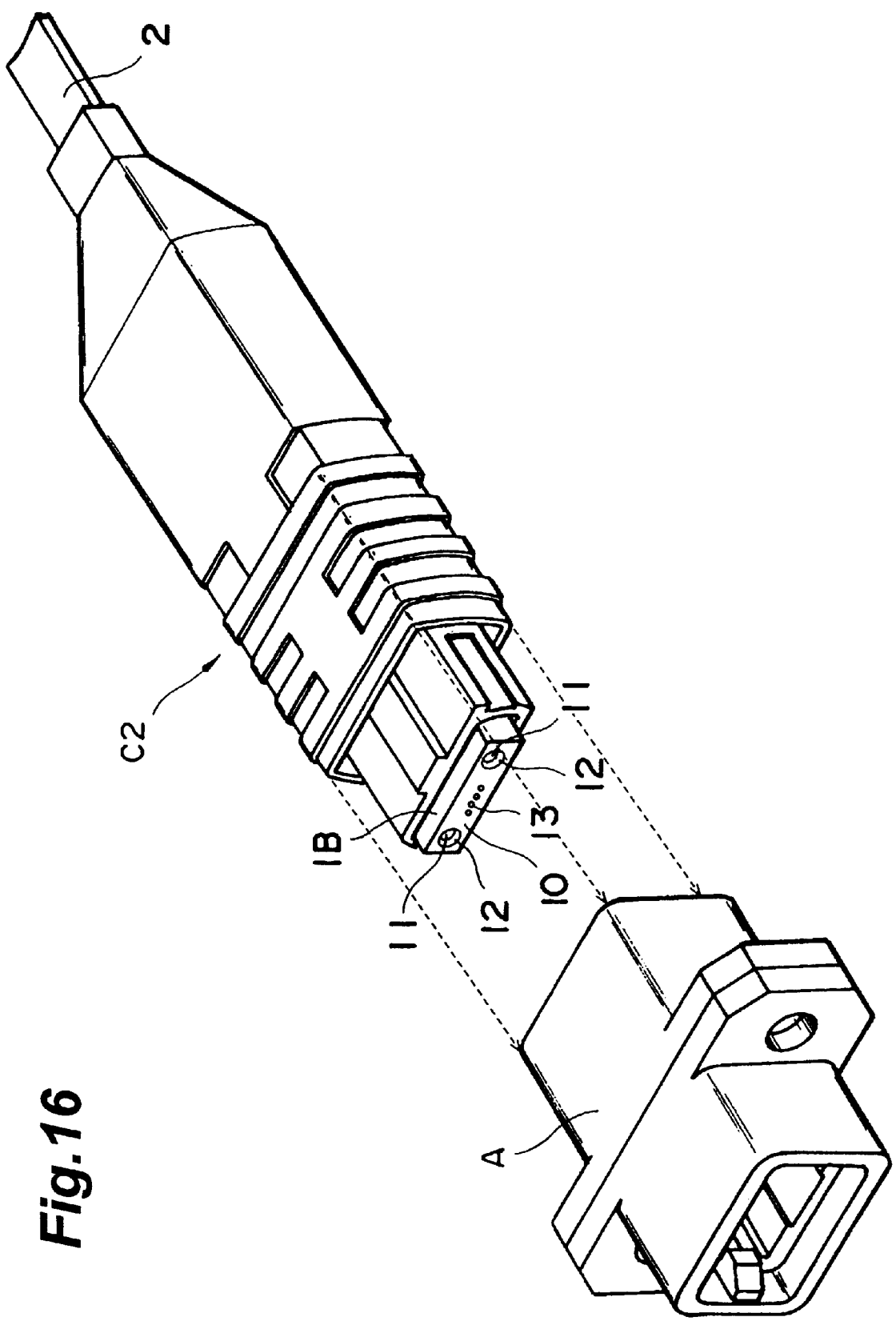
FIG. 16 is a perspective view showing the second embodiment of the optical connector according to the present invention.

An optical connector C2 in FIG. 16 is a so-called push-on type MPO connector. A pair of optical connectors C2 can be connected to each other by inserting them into an adapter A in opposite directions. In this case, connector ferrules 1B incorporated in the distal end portions of the optical connectors C2 are mutually positioned with guide pins (not shown in FIG. 16) and guide-pin holes 11, as in the case of the connector ferrules IA in FIG. 1.

In this case as well, the formation of enlarged regions 12 allows the connector ferrules 1B to be smoothly positioned while preventing the connector ferrules 1B from being damaged or worn. In the case of push-on type optical connectors like the optical connectors C2, since guide pins 3 cannot be seen when they are inserted into the guide-pin holes 11, the guide pins 3 are likely to come into contact with mating end faces 10. This tends to damage or wear the connector ferrules 1B. For this reason, the formation of the enlarged regions 12 is a very effective means for preventing the connector ferrules 1B from being damaged or worn in the push-on type optical connectors.

Note that the optical connector of the present invention is not limited to the above embodiments. For example, enlarged regions may be formed by polishing after a connector ferrule is formed. In addition, the optical connectors may be MT type connectors, MF type connectors, or the like instead of MOP type connectors.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical connector ferrule used in an optical connector to position and fix at least one optical fiber for optical connection, comprising:
    a ferrule body made from a resin by molding and having a mating end face, at least one fiber receiving hole and a pair of guide-pin holes, each of them extending from said mating end face toward the other end of said ferrule body,
    wherein the diameter of said guide-pin holes gradually increases toward said mating end face at a predetermined portion located within a range of 0.1 mm to 1.0 mm from said mating end faceand
    the said mating end face and portions at least from said mating end face to said predetermined portion of said guide-pin holes are integrally-molded.

2. An optical connector ferrule according to claim 1, wherein each of the guide-pin holes has a cylindrical region between said mating end face and said predetermined portion.

3. An optical connector ferrule according to claim 2, wherein each extending length of said cylindrical regions is from 2 μm to 50 μm.

4. An optical connector ferrule according to claim 1, wherein each of said predetermined portions of the guide-pin holes has a truncated cone shape, as defined by its wall, having an apical angle from 30° to 70°.

5. An optical connector ferrule according to claim 1, wherein each of the wall surfaces of said predetermined portions of the guide-pin h holes is formed by a curved surface toward an inside of the guide-pin hole.

6. An optical connector comprising:
    a pair of optical fiber sets each including at least one optical fiber in equal numbers;
    a pair of optical connector ferrules each defined in claim 1, positioning and fixing the respective optical fiber set; and
    a pair of guide pins which are inserted into the guide-pin holes in said optical connector ferrules to butt-joint said mating end faces of said optical connector ferrules to each other.

7. A method of manufacturing an optical connector ferrule used in an optical connector to position and fix at least one optical fiber for optical connection, comprising the steps of:
    providing a mating end-side core having a front end face, a pair of guide-pin hole molding pins and a predetermined number of fiber receiving hole molding pins each protruding from said front end face. wherein each of the guide-pin hole molding pins has a base portion where the diameter increases toward said front end face,
    providing a fiber-side core having a protruding portion for forming an opening of a ferrule body;
    opposing said mating end-side core and said fiber-side core to each other and fastening them together with another element to form a mold, so that said molding pins are suspended in a cavity of the mold and the front end face of said mating end-side core faces the cavity of the mold;
    filling the cavity of said mold around said molding pins with a resin;

forming a ferrule body having a pair of guide-pin holes and a predetermined number of fiber positioning holes by setting the resin;

removing said molding pins from the ferrule body by sliding said mating end-side core and said fiber-side core in a direction in which said cores are to be separated from each other; and taking out the ferrule body from the mold.

8. A method according to claim 7, wherein said fiber-side core further comprises at least one protruding molding portion each having a hole for inserting the guide-pin hole molding pin or the fiber receiving hole molding pin on said mating end-side core, and said protruding molding portion is set to be suspended in the cavity of the mold.

9. A method of manufacturing an optical connector ferrule used in an optical connector to position and fix at least one optical fiber for optical connection, comprising the steps of:

providing a mating end-side core having a front end face and a pair of guide-pin hole molding pins and a predetermined number of fiber receiving hole molding pins each protruding from said front end face wherein each of the guide pin hole molding pins has a base portion where the diameter increases toward said front end face and a fiber-side core having a cavity molding portion;

opposing said mating end-side core and said fiber-side core to each other and fastening them together with another element to form a mold, so that said guide-pin hole molding pins are suspended in a cavity of the mold and the front end face of said mating end-side core faces the cavity of the mold;

filling the cavity of said mold around said guide-pin hole molding pins with a resin;

forming a ferrule body having a pair of guide-pin holes and a predetermined number of fiber positioning holes by setting the resin;

removing said guide-pin hole molding pins from the ferrule body by sliding said mating end-side core and said fiber-side core in a direction in which said cores are separated from each other; and taking out the ferrule body from the mold.

10. A method according to claim 9, wherein said fiber-side core further comprises at least one protruding molding portion each having a hole for inserting the guide-pin hole molding pin on said mating end-side core, and said protruding molding portion is set to be suspended in the cavity of the mold.

11. A method of manufacturing an optical connector ferrule used in an optical connector to position and fix at least one optical fiber for optical connection, comprising the steps of:

providing a mating end-side core having a front end face and a pair of guide-pin hole molding pins protruding from said front end face and having a base portion where the diameter increases toward said front end face and a fiber-side core having a cavity molding portion and a predetermined number of fiber receiving hole molding pins protruding from said cavity molding portion;

opposing said mating end-side core and said fiber-side core to each other and fastening them together with another element to form a mold, so that said guide-pin hole molding pins are suspended in a cavity of the mold and the front end face of said mating end-side core faces the cavity of the mold;

filling the cavity of said mold around said guide-pin hole molding pins with a resin:

forming a ferrule body having a pair of guide-pin holes and a predetermined number of fiber positioning holes by setting the resin;

removing said guide-pin hole molding pins from the ferrule body by sliding said mating end-side core and said fiber-side core in a direction in which said cores are separated from each other; and taking out the ferrule body from the mold.

12. A method according to claim 11, wherein said fiber-side core further comprises at least one protruding molding portion each having a hole for inserting the guide-pin hole molding pin on said mating end-side core, and said protruding molding portion is set to be suspended in the cavity of the mold.

* * * * *